US005680286A

United States Patent [19]
Pacholok

[11] Patent Number: 5,680,286
[45] Date of Patent: Oct. 21, 1997

[54] LOAD FAULT DETECTOR FOR HIGH FREQUENCY LUMINOUS TUBE POWER SUPPLY

[75] Inventor: David Pacholok, Sleepy Hollow, Ill.

[73] Assignee: Everbrite, Inc, Greenfield, Wis.

[21] Appl. No.: 425,262

[22] Filed: Apr. 18, 1995

Related U.S. Application Data

[63] Continuation of Ser. No. 28,277, Mar. 9, 1993, abandoned.

[51] Int. Cl.[6] .......... H02H 3/00
[52] U.S. Cl. .......... 361/42; 361/100
[58] Field of Search .......... 361/42, 47, 84, 361/91, 100; 315/119, 225

[56] References Cited

U.S. PATENT DOCUMENTS

| | | | |
|---|---|---|---|
| Re. 32,904 | 4/1989 | Pacholok | 363/131 |
| 3,843,908 | 10/1974 | Priegnitz | 317/31 |
| 4,613,934 | 9/1986 | Pacholok | 363/131 |
| 4,855,860 | 8/1989 | Nilssen | 361/45 |
| 5,029,269 | 7/1991 | Elliott et al. | 361/91 |
| 5,089,752 | 2/1992 | Pacholok | 315/307 |
| 5,103,138 | 4/1992 | Orenstein et al. | 315/209 R |
| 5,245,498 | 9/1993 | Uchida et al. | 361/47 |

*Primary Examiner*—Jeffrey A. Gaffin
*Assistant Examiner*—Sally C. Medley

[57] ABSTRACT

Apparatus for detecting certain load fault conditions of gaseous luminous tube loads connected to high voltage, high frequency power supplies including open-circuit, broken tube and other balanced load fault conditions. The detector includes a filter for emphasizing the harmonic content of the power supply output, an attenuator, a comparator or other detector/threshold device, and a delay circuit. A power supply shut-down switch may be included or the present fault detector may be interconnected to shut-down switch of a conventional ground fault interrupter. In one embodiment the filter and attenuator and, in another, the filter, attenuator, and delay circuit employ common components and may include a filter/attenuator capacitor defined by placement of metalization on the high frequency power supply transformer adjacent a high voltage output lead.

15 Claims, 3 Drawing Sheets

LOAD FAULT DETECTOR FOR HIGH FREQUENCY LUMINOUS TUBE POWER SUPPLY

This application is a continuation of application Ser. No. 028,277, filed Mar. 9, 1993 now abandoned.

BACKGROUND OF THE INVENTION

The present invention relates to high frequency power supplies for neon and other gaseous luminous tubes and, more specifically, to apparatus for the sensing of certain anomalous load or load fault conditions and for the subsequent interruption of the supply output in response thereto.

Ground fault detection is a well known subset of load fault detection/interruption in which an unbalanced load is detected by monitoring for any 'differential', i.e. unequal, currents between the respective high voltage output leads. Such unbalances are, by definition, the result of a shunting of current through a ground return path. Under ordinary circumstances these ground fault currents are caused by human contact with, for example, an exposed connection of a luminous neon sign. Upon detection of such a 'fault' condition, the power supply is generally disabled until cessation of the fault condition. In this manner the principal objective of this form of load fault detection and interruption—the protection of persons and pets against electrical shock—is achieved.

It is deemed prudent, however, to provide power supply interruption in response to other anomalous operating conditions, for example, following the failure of one or more luminous tube sign segments, due to breakage or otherwise. Convention ground fault interruption circuits have not always proved satisfactory under the diversity of load fault conditions associated with neon tube failure or breakage.

In multiple tube luminous sign topologies, where for example two or more neon tube segments are placed in an electrical 'series' configuration, the breakage of one tube often precipitates a current imbalance not too dissimilar to that caused by inadvertent human contact. Due to the inherent distributed capacitance of neon tube segments, the breakage of one segment does not necessarily cause the total and complete interruption of current through the entire series loop. Indeed, depending on the location of the breakage (i.e. the locations of the remaining good tube segments), a distributed capacitance in the order of 10–40 picofards will facilitate a corresponding 10–30 milliampere current flow through one (or both) of the power supply high voltage leads with such distributed capacitance forming a 'ground' return connection for these currents.

In most cases, the breakage of a single tube segment results in the total cessation of current in one high voltage lead or, at least, a significant imbalance between such leads. Under such circumstances, the current imbalance triggers the conventional ground fault interruption circuitry in the normal fashion thereby shutting-down power supply operation as required.

But this result is not assured. For example, in a multiple tube arrangement where the center tube only is damaged, the current in both of the high voltage power supply leads may be substantially equal thereby defeating normal ground fault interruption operation. Sustained operation under such fault conditions may, in turn, cause failure of high voltage power supply. More specifically, resonance between the distributed capacitance of the remaining 'good' tube segments and the high voltage transformer secondary can produce unexpectedly high output voltages which, in turn, may eventually destroy the transformer through turn-to-turn shorts or insulation breakdown.

The present invention therefore relates to a load fault interruption arrangement particularly adapted to disable high voltage/high frequency luminous tube power supplies under reduced, but balanced, load fault conditions. It will be appreciated that the present load fault system may be employed advantageously in combination with conventional ground fault interruption circuitry whereby the actual power supply 'interruption' or shut-down apparatus of the latter device may be additionally utilized in similar fashion by the present load fault detection system thereby obviating the expense associated with the replication thereof.

In addition to the above-noted output voltage increase (e.g. from 3 KV to 6–12 KV peak), it has been discovered that the output waveform of the 'faulted' neon sign contains significantly higher harmonic content as compared to the normally operated high frequency neon sign. A normally operated high frequency luminous tube power supply may contain as little as 5–10% harmonic distortion while the harmonic output of a faulted supply may be as high as 30–60%.

The present invention advantageously utilizes both attributes—i.e. increased harmonic content as well as increased overall output voltage—to achieve a positive indication of a faulted, or broken, luminous tube condition. More particularly, a single-pole RC high pass filter is coupled to a high voltage secondary lead with the output therefrom, in turn, connected to a detector/comparator. As it is necessary to lower the detected voltage from the normal luminous tube operating voltage (e.g. 3–9 KV) to a much lower trigger level (e.g. 0.5–10 volts), the high pass filter 'doubles' as an attenuator by appropriately selecting the filter cut-off or corner-frequency. Typical filter corner-frequencies in the order of 150 MHz have been found satisfactory.

A significant advantage of the above-described combination filter/attenuator is the corresponding reduction in component values required therefor. The series high pass filter capacitance, for example, need be only in the order of about 3 picofarads. In a preferred embodiment of the present invention this capacitance is inexpensively secured simply by adhering a small section of metalized tape or foil (e.g. ⅜"×¾") to the side of the high voltage transformer.

To avoid false fault triggering otherwise observed to occur upon initial sign energization, the present load fault detector incorporates a detection delay of approximately one millisecond. Research has revealed that non-ionized neon tube segments appear, electrically, as open or 'faulted' tubes until such tubes have fully ionized. This, in turn, results in a transient turn-on condition resembling that of a broken tube.

Again, an extremely inexpensive and efficacious implementation (of the delay circuit) is achieved by selecting a relatively large detector filter capacitor as contrasted with the capacitor of the high pass filter through which the detector capacitor must be charged.

The above-described load fault detector performs well with various interrupter technologies including SCR and triac-based circuitry. Indeed not extrinsic delay capacitance may be required with the triac approach as the inherent time delay of the gate trigger input provides the requisite turn-on delay.

It is therefore an object of the present invention to provide load fault detection and interruption for a high frequency, high-voltage luminous tube power supply that is inexpensive to construct; that detects and responds to certain load fault conditions without regard to whether such fault is balanced, that is, without regard to whether there are in fact any ground fault currents associated therewith; that detects and responds to over-voltage conditions occasioned by the loss of luminous tube segment(s); and that may be used in conjunction with conventional ground fault interruption circuitry.

These and other objects are more fully explicated in the drawings, specification, and claims that follow.

DESCRIPTION OF THE PREFERRED EMBODIMENT

Figure 1:
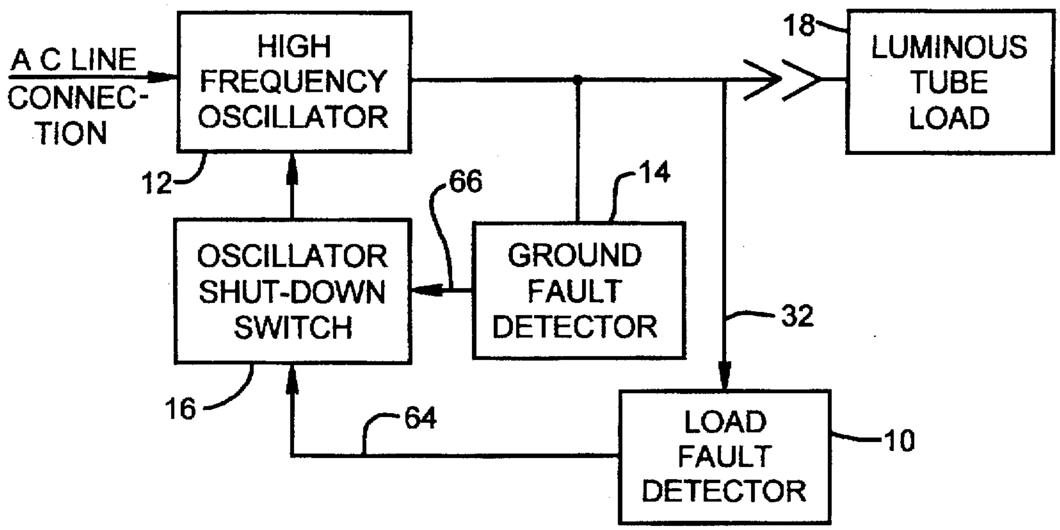
FIG. 1 is a block representation of a high frequency luminous tube power supply incorporating ground fault detection and the load fault detection/interruption of the present invention.

FIG. 1 illustrates the present over-voltage and load fault detector 10 incorporated into a generally conventional high frequency luminous tube power supply 12 including ground fault detection 14 and interruption 16 circuitry also of generally conventional design. The present fault detection/interruption apparatus is suitable for inclusion into virtually any high frequency power supply topology including free-running power oscillators and fixed or free-running low power oscillator/power switch combinations.

Regardless of the specific topology utilized, substantially every high frequency luminous tube power supply employs an output step-up transformer having a high voltage secondary winding (typically 3–9 KV) which in turn is connected to the gaseous luminous tube load 18 (FIG. 1). The ground fault 14 and load fault detection/interruption 10 are additionally interconnected to this secondary winding as shown in more detail in FIG. 5.

Figure 5:
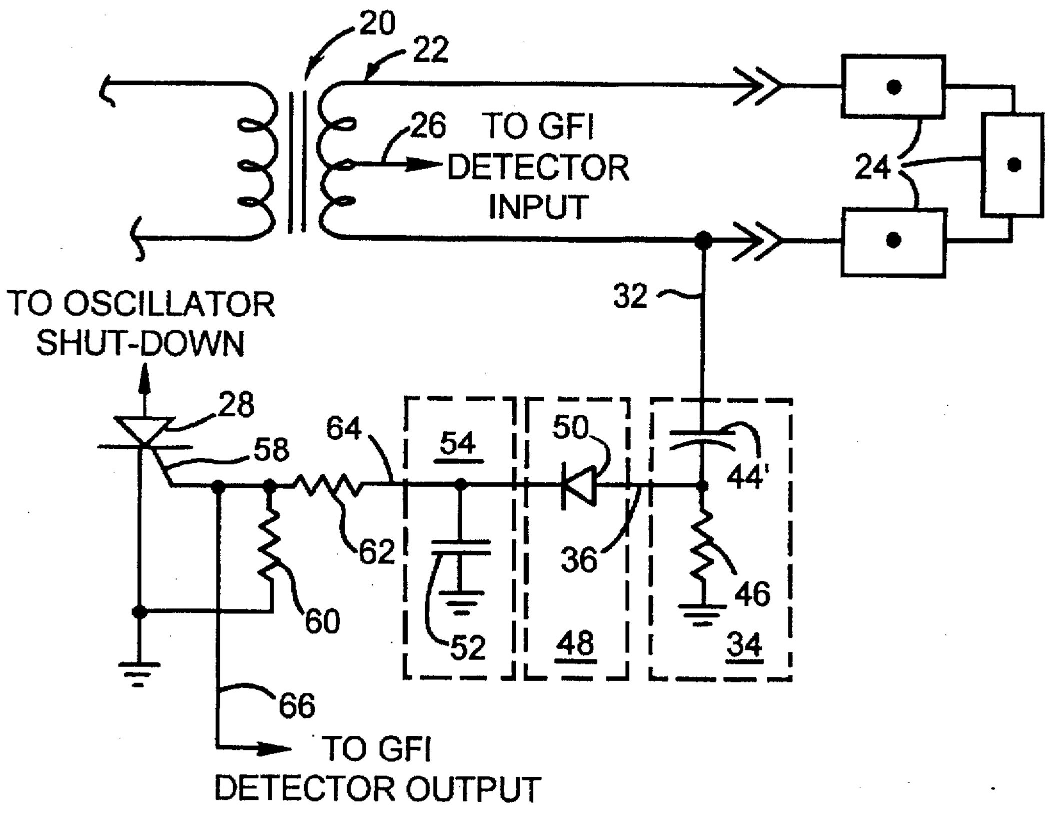
FIG. 5 is a schematic diagram of one embodiment of the present invention shown interfaced to a high frequency luminous power supply having an SCR-based ground fault interrupter.

Referring to FIG. 5, transformer 20 defines the output portion of high frequency power supply 12 (FIG. 1) and includes a center-tapped high voltage secondary winding 22 connected to a luminous tube load comprised, as illustrated in FIG. 5, of three series-connected luminous tube segments 24. The secondary center-tape 26 operatively connects to the ground fault detector 14 (FIG. 1 ), the latter detector functioning in conventional manner to monitor and detect the presence of currents flowing through such center-tap connection.

Under normal operating conditions no current flows in this conductor. The presence of a center-tap current, therefore, indicates a 'ground fault' condition which, upon reaching a predetermined threshold level, triggers switch 16 (FIG. 1 ) to terminate further oscillator/power supply operation. It will be appreciated that various devices may be selected for switch 16 including, for example, the SCR 28 of FIG. 5 or the triac 30 of FIG. 6, bipolars, FETs and opto-isolators.

Ground fault interrupters are well known in the art and will not be discussed in detail herein except to emphasize an important economy-producing feature of the present invention wherein a single interrupter switch 16 may be employed to achieve power supply shut-down upon detection of either a conventional ground fault or an over-voltage or defective/broken tube segment fault.

Figure 2:
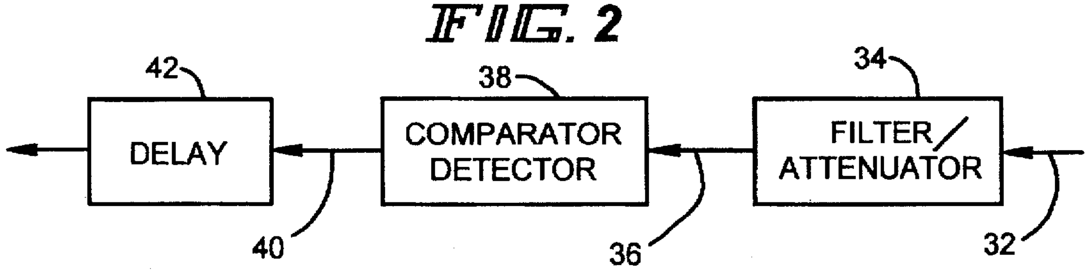
FIG. 2 is a block representation of one embodiment of the load fault detector of FIG. 1.
Figure 4A:
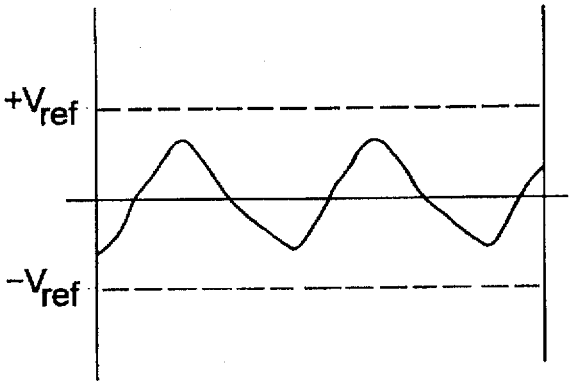
FIG. 4*a* is a waveform diagram of the voltage waveform output of the filter of FIGS. 2 and 3 under normal power supply load conditions.
Figure 4B:
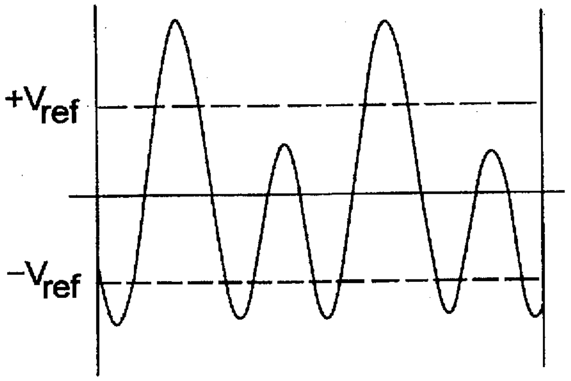
FIG. 4*b* is a waveform diagram of the voltage waveform output of the filter of FIGS. 2 and 3 under faulted power supply load conditions.

One embodiment of the over-voltage/load fault detector 10 of the present invention is shown in block form in FIG. 2. Detector 10 input 32 is preferably connected to one of the high voltage secondary leads of transformer 20 (see FIG. 5) where it is first filtered by high pass filter 34. As detailed further below, FIGS. 4*a* and 4*b* illustrate the output waveforms at 36 from filter 34, respectively, under normal and faulted load conditions. These filtered waveforms are thereafter connected to comparator/detector 38, the function of which is to generate a shut-down gating signal at 40 when a predetermined threshold voltage from filter 34 is exceeded. This gating signal is passed, in turn, through a delay network 42, then, to the previously discussed shut-down switch 16.

To fully appreciate operation of load fault detector 10, reference is made to the voltage waveforms of FIGS. 4*a* and 4*b*. More specifically, a comparison of normal and faulted power supply output waveforms reveals an important distinction, namely, that the harmonic content of the output dramatically increases under most faulted load conditions. Thus, differences between the normal and faulted power supply output waveforms, which might otherwise appear less than significant, may be significantly magnified by processing the supply output, for example, by applying the power supply output to an appropriate filter. FIGS. 4*a* and 4*b* represent just such processed waveforms, more specifically, the power supply output voltages at 36 after passage through filter 34.

Filter 34 is of the single-pole high pass variety having a cut-off or corner frequency well above the power supply operating frequency. It will be appreciated that other filter topologies may be employed, however, the straightforward single-pole high pass arrangement shown herein is both sufficient and economically suitable. Filter 34 may or may not additionally and advantageously double as an attenuation. Alternatively, a separate attentuator of conventional design (not shown) may be positioned before or after filter 34. Typically 60–80 db of attenuation is required to lower the power supply output voltage from its nominal 3 KV level to the 0.5–10 volt logic-level required of most signal processing circuitry, in particular, the comparator/detector 38 to which the filter output is subsequently connected.

FIG. 4*a* represents filter 34 output waveform when connected to a typical high frequency power supply operating under normal load conditions. FIG. 4*b* is the same waveform when the supply is subjected to a faulted load such as a broken or missing luminous tube segment. It will be observed that the waveform of FIG. 4b contains more harmonic content and is of a higher absolute magnitude. This latter condition is due, in part, to the former—filter 34 attenuates the harmonic frequencies less and consequently passes more total energy under the harmonic-rich faulted load condition of FIG. 4b. The filtered waveform of FIG. 4b may also be of greater magnitude due to an absolute increase in the power supply output voltage under no or reduced load conditions.

The above-discussed output-to-detector attenuation may be achieved without resort to further components or complexity by selecting a sufficiently high filter cut-off frequency—the higher the cut-off frequency, the greater the attenuation. As discussed below in connection with FIG. 5, a cut-off frequency in the order of 150 MHz has been found appropriate.

Referring again to FIG. 2, the filtered power supply output is connected to comparator/detector 38, the function of which is to output, at 40, a signal whenever the input signal level to detector 38 exceeds a predetermined level. This level is depicted as $V_{ref}$ in FIGS. 4a and 4b and is selected such that the output from filter 34 does not exceed $V_{ref}$ during normal operation but does exceed $V_{ref}$ under broken, missing, or other similar faulted load conditions. Again, FIGS. 4a and 4b illustrate, respectively, the normal and faulted load conditions with the filtered signal level exceeding the threshold, $V_{ref}$, only in the latter faulted-load case.

A delay circuit is interposed between detector 38 and the oscillator shut-down switch 16 (FIG. 1) to force an approximately 1 millisecond delay in the deactivation of the high frequency power supply 12. It was found that in the absence of this delay function, false power supply shut-downs could occur upon initial power supply activation. Investigation revealed that a perfectly 'healthy' gaseous luminous tube nevertheless appears electrically very similar to a broken tube until the gas medium therein has become sufficiently active, i.e. ionized.

Figure 3:
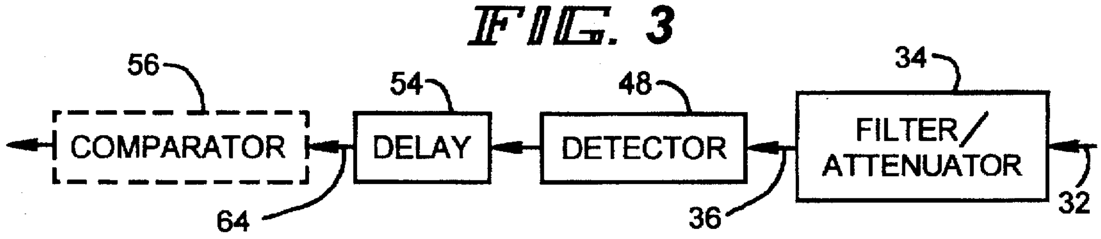
FIG. 3 is a block representation of another embodiment of the load fault detector of FIG. 1.

It will be appreciated that several permutations are available and contemplated by the present invention with respect to the detector/comparator/delay functions. There is not, in short, a prescribed implementation or order to these functions and consequently other embodiments will perform satisfactory so long as the basic required functions are replicated thereby. FIG. 3 is an example in block form of one such alternative arrangement. FIG. 5 is a schematic implementation of the embodiment of FIG. 3.

Referring therefore to FIGS. 3 and 5, one terminal of the high voltage power supply output is connected at 32 to high pass filter 34, which filter is comprised of series capacitor 44 and shunt resistor 46. The output therefrom, again designated 36, connects to detector 48 defined by the single component, diode 50. The rectified output from detector 50 feeds shunt capacitor 52 which serves both as a conventional filter capacitor for the detector rectifier diode 50, but importantly as the delay element 54.

Delay, in the present embodiment, is achieved by an appropriate selection of the capacitances of, or more accurately the capacitance ratio between, capacitors 44 and 52. As noted above, filter 34 may advantageously double as an attenuator by selecting an appropriately high filter cut-off frequency, for example, greater than 1000 times the power supply operating frequency. A cut-off frequency of 160 MHz, as employed herein, nets nearly 80 db of attenuation at a fundamental power supply frequency of 20 KHz. Typical values for high pass filter capacitor 44 is 3 picofarads and for resistor 46 is 330Ω.

Several additional advantages of economy flow from the extremely low capacitance 44 permitted by this high-attenuation filter design. The first relates to the delay function currently under consideration. More specifically, the effective source impedance of the low 3 pf filter capacitance 44 precludes the instantaneous charging of any substantial capacitive load. Thus, delay capacitor 52 is deliberately chosen to effect the desired 1 ms delay by requiring approximately twenty power supply output charging cycles in order to 'pump up' the voltage across capacitor 52 to the 0.5–10 volt level required to trigger oscillator shut-down switch 16 (FIG. 1). Capacitor 52 is nominally 0.047 μf in the embodiment of FIG. 5.

Referring still to FIGS. 3 and 5, the output from delay circuit 54 (delay capacitor 52) is operatively interconnected to comparator 56, in turn, to shut-down switch 16 (FIG. 1). Comparator 56 is shown in dotted format to signify that the comparator function may be found in, and defined by, for example, the intrinsic gate trigger potential of the solid-state switching device employed. Under such circumstances, no additional or specific comparator hardware is required.

One such solid-state switch 16 is the SCR 28 of FIG. 5 with its trigger gate input 58. The typical gate trigger potential for an SCR is 0.6 volts. This potential effectively serves as the comparator threshold or reference voltage, $V_{ref}$. When the output across delay capacitor 52, as scaled by voltage divider resistors 60 and 62, exceeds 0.6 volts, this 'pseudo-comparator' function of the SCR gate 58 is activated, causing SCR triggering and power supply shutdown.

It will be observed in the embodiment of FIG. 5, that the gate 58 of SCR 28 is connected to both the output of the above-described load fault detector at 64 as well as to the output of a conventional ground fault detector 14 (FIG. 1) via 66. In this manner, additional overall power supply economy is achieved by obviating the need for multiple interrupter, shut-down switches.

As discussed above, use of a small high pass filter capacitor 44 (e.g. 3 pf) is accompanied by several economic-based design advantages including the previously discussed essentially componentless incorporation of the delay timer as ancillary to the otherwise required high pass/detector filter capacitors 44 and 52. A second significant benefit arising from this low-capacitance filter design is the ability to obtain and fabricate this capacitor—which capacitor must additionally be able to withstand the multiple KV power supply output voltages—at virtually no expense by adhering a small area of metalization to the transformer exterior adjacent one of the high voltage secondary leads.

Figure 7:
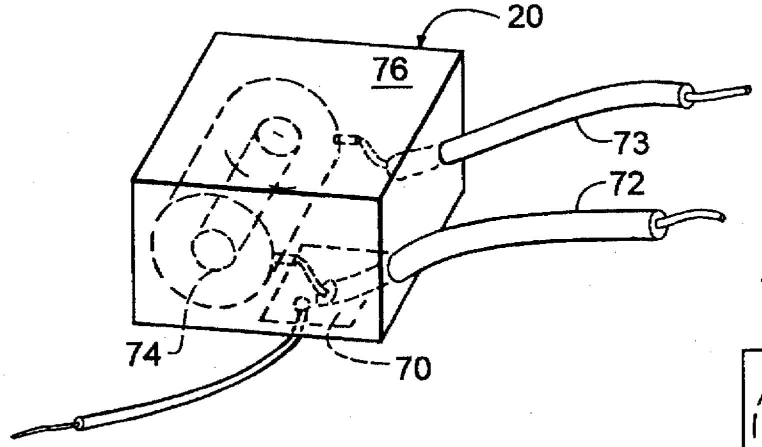
FIG. 7 is a perspective view of a high frequency, high voltage transformer as shown in FIGS. 5 and 6 illustrating construction of the attenuator/filter capacitor; and, FIG. 8 is a front elevation view of the transformer of FIG. 7.
Figure 8:
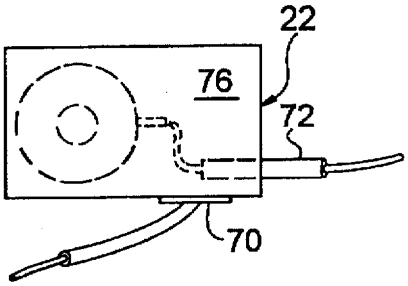

As shown in more detail in FIGS. 7 & 8, a region of metalization 70 is placed on the outside of transformer 20 generally adjacent one of the high voltage output leads 72. More specifically, the cylindrical region 74 shown represents the ferrite transformer core with primary and secondary windings thereon. Two of the transformer leads, specifically the high voltage secondary leads 72 are shown extending outwardly from the righthand portion of the transformer. The generally cube-shaped solid 76 which surrounds the transformer windings, and onto the bottom of which the metalization 70 is placed, is a dielectric potting material commonly employed in high voltage transformer construction to minimize vapor contamination and corona problems. This potting material additionally serves as the dielectric for the capacitor 44 formed between metalization 70 and the high voltage lead 72 passing adjacent and immediately thereover.

Figure 6:
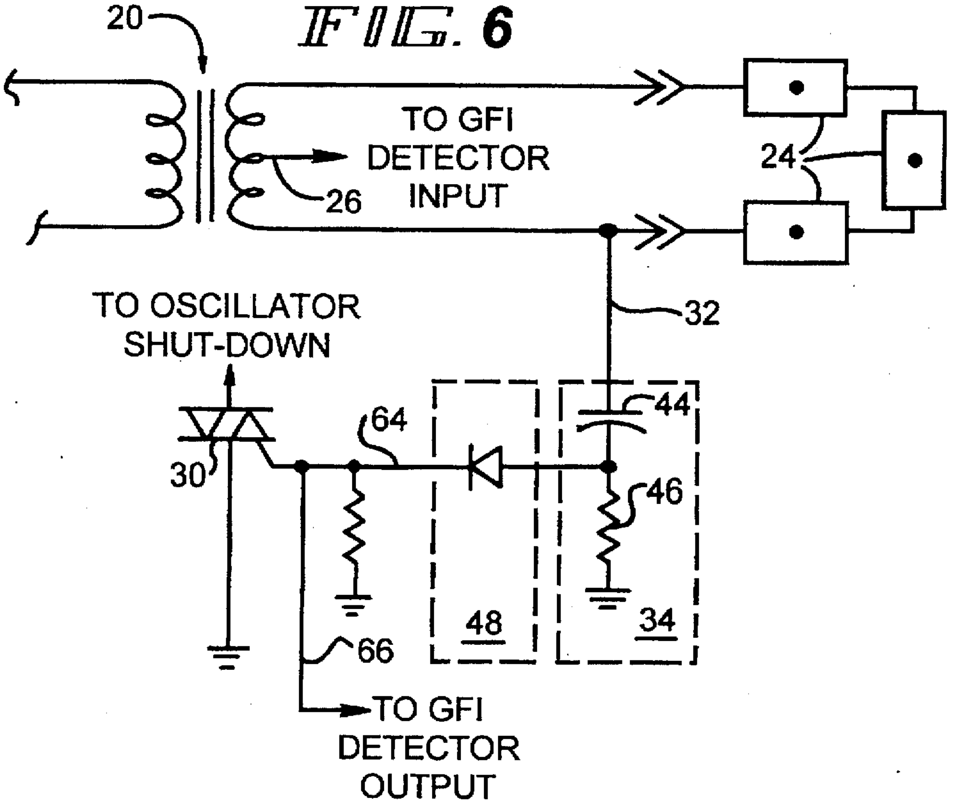
FIG. 6 is a schematic diagram of an alternative embodiment of the present invention shown interfaced to a high frequency luminous power supply having a triac-based ground fault interrupter.

FIG. 6 illustrates an alternative arrangement for the present load fault detector connected to a triac 30 power supply shut-down switch 16 (FIG. 1 ). It will be observed that in similar fashion to the embodiment of FIG. 5, both conventional ground fault, at 66, and load fault, at 64, are provided and interconnected to a single shut-down device, triac 78 in the apparatus of FIG. 6.

I claim:

1. Apparatus for detecting load faults adapted for use in a high frequency luminous tube power supply having ground fault interruption means operatively connected to the power supply for disabling said supply upon detection of a predetermined ground fault current, the ground fault interruption means includes power supply shut-down switch means, the power supply operating at a predetermined high frequency; the load fault detecting apparatus includes filter means operatively connected to the power supply output for passing harmonic energy and for attenuating fundamental high frequency energy of the power supply output; detector means connected to the filter means for producing a detected signal representative of the magnitude of energy from the filter means; the detected signal having an output for connection to the power supply shut-down switch means whereby further operation of the high frequency power supply is terminated when the detected signal exceeds a predetermined signal level; delay means operatively connected to the detector means for inhibiting operation of the shut-down switch means for a predetermined interval whereby a detected signal exceeding the predetermined level caused by the turn-on and gas ionization of a luminous tube will not result in power supply shut-down whereby the power supply shall be shut-down only in response to a load fault condition.

2. The apparatus for detecting load faults of claim 1 wherein the filter means includes component members that provide said harmonic energy passing and provide loss at the harmonic and fundamental power supply frequencies whereby the detected signal may be operatively connected directly to the power supply shut-down switch means.

3. The apparatus for detecting load faults of claim 1 wherein the filter means has a cut-off frequency and wherein said cut-off frequency is substantially above the operating frequency of the high frequency supply wherein the filter means provides an attenuating function.

4. Load fault interrupter apparatus for high frequency luminous tube power supplies including means operatively connected to the power supply output for selectively filtering harmonic energy; detector means connected to the filter means for producing a detected signal representative of the magnitude of energy from the filter means; switch means operatively connected to the detector means for terminating power supply operation when the detected signal exceeds a predetermined level; delay means operatively connected to the detector means for inhibiting operation of the switch means for a predetermined interval whereby a detected signal exceeding the predetermined level caused by the ordinary turn-on and gas ionization of a luminous tube will not result in power supply shut-down whereby the power supply shall be shut-down only in response to genuine load fault conditions.

5. Load fault interrupter apparatus for a high frequency luminous tube power supply, the supply operating at a predetermined high frequency and including a high pass filter connected tot he power supply output, the high pass filter having a cut-off frequency; a detector connected to the high pass filter, the detector produces a detected signal representative of the magnitude of the output of the high pass filter; switch means operatively connected to the high pass filter for terminating power supply operation when the detected signal exceeds a predetermined level; attenuator means for reducing the magnitude of the detected signal to the switch means; delay means operatively connected to the detector for inhibiting operation of the switch means for a predetermined interval whereby a detected signal exceeding the predetermined level caused by the ordinary turn-on and gas ionization of a luminous tube will not result in power supply shut-down whereby the power supply shall be shut-down only in response to genuine load fault conditions.

6. The load fault interrupter of claim 5 wherein the attenuator and filter means are combined and defined as a single assembly whereby load fault detection may be achieved with fewer components than would be required were separate attenuator and filter means to be used thereby increasing interrupter reliability and decreasing interrupter cost.

7. The load fault interrupter of claim 5 wherein the high pass filter cut-off frequency is substantially higher than the operating frequency of the high frequency power supply whereby said substantially higher cut-off frequency results in the high pass filter providing increased attenuation compared to a conventional high pass filter having a cut-off frequency in the order of the operating frequency.

8. The load fault interrupter of claim 5 wherein the high pass filter has a cut-off frequency greater than 1000 times the operating frequency of the power supply whereby the high pass filter provides increased attenuation compared to a conventional high pass filter having a cut-off frequency in the order of the operating frequency.

9. The load fault interrupter of claim 5 wherein the high pass filter is of the single-pole type having a cut-off frequency higher than the power supply operating frequency whereby the harmonic content of the power supply output will be passed through the high pass filter with less attenuation than the fundamental output of the power supply thereby emphasizing the harmonic content of the power supply output while simultaneously maintaining a continued responsiveness to the fundamental content of the power supply output whereby increases in harmonic components of the power supply output aid in the detection of open circuit and load fault conditions.

10. The load fault interrupter of claim 5 in which the switch means includes a control signal input, the switch means turning on when the signal at the control input exceeds a predetermined level for a predetermined interval, the detector means operatively connected to the switch means control input whereby said predetermined interval of the switch means defines said delay means whereby delayed load fault interruption is achieved without the incorporation of additional delay-inducing components.

11. Load fault interrupter apparatus for high frequency luminous tube power supplies having power supply output fault detecting means, the fault detecting means including operatively interconnected high pass filter means, attenuator means, detector means, and delay means connected to the power supply output; the fault detecting means having an output representative of the power supply output and harmonic content of that output; switch means operatively connected to the fault detecting means for terminating power supply operation when the fault detecting means output exceeds a predetermined level; the delay means of the fault detecting means inhibits the fault detecting means output for a predetermined interval whereby fault detecting means outputs above said predetermined level that would otherwise occur by reason of normal gaseous tube ionization will be inhibited and therefore will not trigger switch means power supply shut-down.

12. Load fault interrupter apparatus for high frequency luminous tube power supplies having power supply output fault detecting means including a series capacitor connected to the power supply output and a shunt impedance, said series capacitor and shunt impedance defining means for filtering and for attenuating; detector means being operably connected to the series capacitance and shunt impedance, the detector means having a rectified output representative of the filtered and attenuated power supply output, the detector means including a shunt detector filter capacitor connected across the rectified output of the detector means; the series capacitance and shunt filter capacitor defining a delay means; the series capacitance being substantially less than the shunt capacitance whereby multiple high frequency power supply cycles are required to charge the shunt detector filter capacitor through the series capacitor thereby defining the delay function.

13. Load fault interrupter apparatus for a high frequency luminous tube power supply having an output and an output transformer, the transformer having an output winding defined by windings of wire and having insulating means surrounding the winding, the power supply having integral high pass filter and attenuator functions defined by a single RC network operatively connected to the power supply output comprising a series capacitance and shunt resistance; detector means operatively connected to the RC network having an output representative of the power supply output; switch means connected to the detector means and to the power supply for terminating power supply operation when the output from the RC network exceeds a predetermined level corresponding to known load fault conditions.

14. The load fault interruptor of claim 13 in which said high pass and attenuator functions are achieved by selection of a low-valued series capacitance less than 10 picofarads; said capacitance being formed and defined as the capacitance between an output lead of the power supply and a metallized connection adjacnet to, but not in direct physical contact with, said output lead.

15. The load fault interruptor of claim 14 in which the series capacitance metallized connection is affixed to the output winding insulation means.

* * * * *